United States Patent [19]

Sommese et al.

[11] Patent Number: 5,346,628
[45] Date of Patent: Sep. 13, 1994

[54] POLYMERS FOR FLOCCULATING RED MUD FROM BAYER PROCESS LIQUORS

[75] Inventors: Anthony G. Sommese, Naperville; Robert P. Mahoney, Warrenville, both of Ill.

[73] Assignee: Nalco Chemical Company, Naperville, Ill.

[21] Appl. No.: 146,288

[22] Filed: Oct. 29, 1993

[51] Int. Cl.$^5$ .................................................. C02F 1/56
[52] U.S. Cl. ..................................... 210/734; 210/731
[58] Field of Search ................ 210/734, 732, 735, 731

[56] References Cited

U.S. PATENT DOCUMENTS

| | | |
|---|---|---|
| 3,085,853 | 4/1963 | Lesinski et al. . |
| 3,284,393 | 11/1966 | Vanderhoff et al. . |
| 3,390,959 | 7/1968 | Sibert . |
| 3,397,953 | 8/1968 | Galvin et al. . |
| 3,445,187 | 5/1969 | Sibert . |
| 3,541,009 | 11/1970 | Arendt et al. . |
| 3,624,019 | 11/1971 | Anderson et al. . |
| 3,681,012 | 8/1972 | Sibert . |
| 3,975,496 | 8/1976 | Smalley et al. ...................... 210/734 |
| 4,217,214 | 8/1980 | Dubin .................................. 210/735 |
| 4,421,602 | 12/1983 | Brunnmueller et al. .......... 162/168.2 |
| 4,444,667 | 4/1984 | Burkert et al. ...................... 210/735 |
| 4,545,902 | 10/1985 | Connelly et al. .................... 210/734 |
| 4,678,585 | 7/1987 | Brownrigg ........................... 210/734 |
| 4,717,550 | 1/1988 | Spitzer et al. . |
| 4,767,540 | 8/1988 | Spitzer et al. . |
| 4,880,497 | 11/1989 | Pfohl et al. ......................... 162/135 |
| 4,921,621 | 5/1990 | Costello et al. .................. 252/8.513 |
| 4,952,656 | 8/1990 | Lai et al. ........................... 525/328.2 |
| 5,008,089 | 4/1991 | Moody et al. ....................... 210/734 |
| 5,037,927 | 8/1991 | Itagaki et al. . |
| 5,225,088 | 7/1993 | Moench et al. ..................... 210/734 |

*Primary Examiner*—Neil McCarthy
*Attorney, Agent, or Firm*—Robert A. Miller; Joseph B. Barrett; James J. Drake

[57] ABSTRACT

Red mud is flocculated from Bayer process liquors using a polymer which contains vinylamine and/or vinylformamide.

8 Claims, No Drawings

POLYMERS FOR FLOCCULATING RED MUD FROM BAYER PROCESS LIQUORS

FIELD OF INVENTION

The invention relates to the use of vinylamine and/or vinylformamide containing polymers to treat Bayer process liquors containing suspended solids, these polymers flocculate and settle the suspended solids and improve the supernatant clarity of the system.

DESCRIPTION OF THE PRIOR ART

The Bayer process for recovering alumina from bauxite is well known. In the Bayer process, bauxite is digested in an aqueous alkaline liquor. The insoluble residue is referred to as red mud and is separated from the digestion liquor in a primary settler stage. The overflow (i.e. liquor) from the primary settler can be separately treated in a secondary clarification stage to remove any residual suspended solids (red mud) before alumina trihydrate is recovered.

Red mud is typically washed in a plurality of sequential wash stages. In each stage, the red mud is washed with a wash liquor flocculated with a flocculating agent and separated from the wash liquor. Flocculating agents are used to increase the rate of settling, improve the clarity of the supernatant liquor by reducing residual suspended solids, and/or increase the density of the settled solids.

Naturally occurring polymeric flocculating agents used in the process include starch or dextran. The naturally occurring polymers have been replaced, or are used in combination, with by synthetic anionic flocculating agents; specifically acrylic acid polymers. Blends of synthetic polymers and starches have also been suggested as red mud flocculants in U.S. Pat. Nos. 3,445,187 and 3,541,009. U.S. Pat. No. 4,767,540 discloses flocculating red mud with a synthetic hydroxamic acid polymer and a conventional flocculant, such as starch or a synthetic polymer.

Generally, the present invention relates to the use of water-soluble polymers containing vinylamine and/or vinylformamide to treat Bayer process liquors. These polymers flocculate and settle the suspended red mud particles and afford improved clarity of the supernatant liquor. More specifically, the invention relates to improved polymers for removing red mud from Bayer liquors. The polymers of the invention contain vinylamine and/or vinylformamide either of which may be present with acrylic acid as a copolymer or they may be combined to produce terpolymers with acrylic acid.

SUMMARY OF THE INVENTION

The invention provides a method for settling red mud from a Bayer process liquor. The method comprises adding to a Bayer process liquor containing suspended red mud particles a flocculant polymer which contains acrylic acid and from about 1 to about 99% by weight of at least one monomer selected from the group consisting of vinylamine and vinylformamide.

DESCRIPTION OF THE PREFERRED EMBODIMENTS

The invention provides a process for treating a Bayer process liquor containing suspended red mud. The invention provides an improved method for removing red mud from these liquors. The invention uses a polymeric flocculant to accomplish this goal. According to the invention a polymer which contains from about 1 to about 99 mole percent vinylamine monomer and/or a monomer hydrolyzable to vinylamine, and/or from 1–97 mole percent of vinylformamide monomer. The remaining portion of the polymer is preferably acrylic acid monomer or a monomer hydrolyzable to acrylic acid.

For purposes of this invention, vinylamine monomers includes vinylamine and those monomers which are hydrolyzable to the following formula:

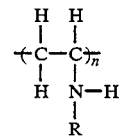

wherein: R is, preferably, one substituent group selected from the group consisting of hydrogen and an alkyl group having from 1–10 carbon atoms. More preferably, R is hydrogen or is an alkyl group having 1 to 4 carbons.

The vinylformamide monomer of the invention is non-hydrolyzed and has the following structure:

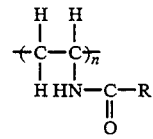

wherein: R is, preferably, one substituent group selected from the group consisting of hydrogen and an alkyl group having from 1–10 carbon atoms. More preferably, R is hydrogen or is an alkyl group having 1 to 4 carbons.

For purposes of the invention, acrylic acid monomer includes acrylic acid and those monomers hydrolyzable to the following formula:

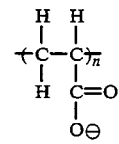

According to one embodiment of the invention, the Bayer process liquor is treated with a vinylamine/acrylic acid copolymer. Preferably, the copolymer will include from about 1 to about 99 mole % vinylamine and about 1 to about 99% acrylic acid. More preferably, the copolymer will include from about 2 to about 50 mole % vinylamine and from about 98 to about 50 mole % acrylic acid. Most preferably, the vinylamine is included in the copolymer in an amount of from about 10 to about 20 mole % and the acrylic acid is included in an amount of from about 90 to about 80 mole %.

According to a further embodiment of the invention, the Bayer process liquor is treated with an acrylic acid/vinylamine/vinylformamide terpolymer of the invention. Preferably, the terpolymer includes from about 1 to about 97% vinylamine, from about 1 to about 97% vinylformamide and from about 97 to about 1% acrylic acid. More preferably, the terpolymer includes from about 10 to about 50% vinylamine, from about 10 to about 50% vinylformamide and from about 80 to about 50% acrylic acid. Most preferably, the terpolymer includes from about 10 to about 20% vinylamine, from about 10 to about 20% vinylformamide and from about 80 to about 60% acrylic acid.

The polymers of the present invention are added to the Bayer process liquor at a dosage of from about 1 to about 100 mg per liter of Bayer process liquor. More preferably, the polymers of the invention are added to the Bayer process liquor in an amount of from about 10 to about 50 mg/l of liquor. Most preferably, the polymers of the invention are added to the Bayer process liquor in an amount of from about 10 to 40 mg/l of liquor.

The polymers of the invention have been demonstrated in the Examples below to be useful in flocculating red mud throughout the Bayer process. Example 1 demonstrates that the invention facilitates red mud settling in both the high alkalinity of the settler feed and in the lower alkalinity environment of the red mud washing circuit. Accordingly, the present invention is directed to flocculating red mud at any point in the Bayer process and is without limitation with regard to any particular operation in the Bayer process.

Processes for making the polymers of the invention are well known in the art. U.S. Pat. Nos. 5,126,395, 5,037,927, 4,952,656, 4,921,621, 4,880,497 and 4,441,602 all describe methods for preparing the polymers of the invention. According to one embodiment of the invention, the amine-containing polymers of the invention are synthesized by copolymerizing acrylic acid (as sodium acrylate) with vinylformamide. Although solution polymerization produces desirable high molecular weights, inverse emulsion (water-in-oil) polymerization is preferred. The resulting polymers of sodium acrylate/vinylformamide are susceptible to alkaline or acid hydrolysis which converts some or all of the amide groups to amine groups. This hydrolysis phenomena is described in U.S. Pat. No. 4,421,602, the disclosure of which is incorporated herein by reference. Thus, by controlling the stoichiometry of the hydrolyzing agent (acid or base) it is possible to produce sodium acrylate/vinylamine copolymers or sodium acrylate/vinylamine/vinylformamide terpolymers.

For example, it has been determined that a 1% solution of a 60/40 vinylformamide/sodium acrylate polymer when subjected to hydrolysis for three hours at 85° C, using 1% caustic solution, will produce a terpolymer of vinylamine/vinylformamide/sodium acrylate. If the concentration of the caustic is increased to 5%, only the copolymer of vinylamine/sodium acrylate is produced. It should be noted that all the vinylamine contained in the polymers of the invention is preferably the result of hydrolysis to yield the amine, and not by copolymerization with vinylamine (which is unavailable and is not known to polymerize) nor is the vinylamine produced through rearrangement, such as the Hoffman Rearrangement of acrylamide. It is conceivable, to those skilled in the art, to polymerize vinylformamides, with esters or amides of acrylic acid, which when subjected to hydrolysis yield acrylate-vinylamine (formamide) polymers.

According to the invention, the hydrolysis of the polymer is followed by () addition to a Bayer liquor to flocculate red mud. Preferably, since caustic hydrolysis is required for amide hydrolysis, the vinylformamide/sodium acrylate polymer can be added directly to the Bayer liquor without prior hydrolysis. The highly caustic nature of the Bayer liquor coupled with the high temperature (40°–110° C.) should effectively hydrolyze the amide groups. The amount of hydrolysis will depend on the original polymer content, the amount of caustic in the Bayer liquor, the time in the liquor and the temperature of the Bayer liquor.

The following examples are presented to describe preferred embodiments and utilities of the invention and are not meant to limit the invention unless otherwise stated in the claims appended hereto.

EXAMPLE 1

The polymers of the invention were laboratory tested to establish their effectiveness as flocculants for red mud. The red mud slurries that were evaluated were synthesized to correspond generally to red mud slurries that resembled either the red mud slurries found in the Bayer process settlers (308 g/L NaOH concentration) or in the washer train (50 g/L NaOH concentration). The results of these studies are set forth in Table 1.

TABLE 1

Results of Red Mud Settling Tests

| Polymer | Composition AA/VA/VF | Dose (mg/l) | Settling Rate (Ft/hr) | NaOH Conc. in liquor (g/l) |
|---|---|---|---|---|
| A | 40/20/40 | 40 | 10 | 308 |
| B | 40/60/0 | 20 | 16 | 50 |
| C | 40/30/30 | 20 | 10 | 50 |
| D | 40/60/0 | 20 | 9 | 50 |
| E | 80/20/0 | 20 | 15 | 50 |
| F | 80/0/20 | 20 | 12 | 50 |
| G + H | 0/100/0 (G) | 30 + 4 | 14 | 50 |
| H + G | 0/100/0 (G) | 4 + 30 | 11 | 50 |
| E | 80/20/0 | 10 | 10 | 50 |
| E | 80/20/0 | 20 | 9 | 308 |
| F | 80/0/20 | 30 | 13 | 308 |
| G + H | 0/100/0 (G) | 30 + 8 | 115 | 308 |
| J | 35/20/45 | 30 | 12 | 308 |

NOTES
Polymer H is NALCO ® 7879, a latex polyacrylate flocculant used in the industry.
AA - acrylic acid (or salt) group
VA - vinylamine group
VF - vinylformamide group

EXAMPLE 2

Red Mud Settling Test Results

Tests were conducted with red mud washer slurry from an operating alumina refinery. The total alkalinity of the test slurry liquor was 23 g/L expressed as $Na_2CO_3$ and the slurry solids content was 59.7 g/L. A standard treatment polymer for this type of slurry is a copolymer of acrylate and acrylamide with 70–80% acrylate level (Polymers K and L, see Table 2). The polymers of the invention E and F (E and F see Table 2) have improved performance as described below.

Polymers E and F settle red mud resulting in an overflow liquor containing less suspended solids than from standard (Polymer K or L) treatment. A lower suspended solids content in the overflow (supernatant) liquor results in improved purity of the liquor that reports to the precipitation stage of the Bayer process. Improved purity of the aluminate liquor results in reduced filtration requirements, reduced filter aid consumption, ease of operation, and improved purity of the alumina trihydrate produced.

Alternatively, the polymers of the invention E or F may be added in combination with the standard polyacrylate or poly(acrylate/acrylamide). Tests 5 and 6, summarized in Table 2 below, show that co-addition of polymer E or F with a standard polymer like polymer L causes increased settling rate and improved overflow clarity compared to polymer L treatment alone. This combined treatment could be added together or sequentially on either order.

| | | Red Mud Settling Test Results | | |
|---|---|---|---|---|
| No. | Polymer Treatment | Polymer Dose (mg/L) | Settling Rate (ft/hr) | Compaction (mL) | Overflow Clarity (mg/L) |
| 1 | K | 4.0 | 60 | 290 | 186 |
| 2 | K | 3.2 | 18 | 335 | 186 |
| 3 | L | 4.0 | 69 | 310 | 180 |
| 4 | L | 3.2 | 41 | 325 | 241 |
| 5 | E/L | 30/3.2 | 197 | 298 | 162 |
| 6 | F/L | 30/3.2 | 212 | 290 | 139 |
| 7 | E | 60 | 8 | 370 | 73 |
| 8 | F | 60 | 33 | 315 | 73 |
| 9 | E | 100 | 16 | 345 | 133 |
| 10 | F | 50 | 21 | 328 | 51 |

| | Polymer Compositions | |
|---|---|---|
| Polymer | Composition | RSV (dL/g) |
| K | 80/20 acrylate/acrylamide | 40–55 |
| L | 70/30 acrylate/acrylamide | 45–55 |
| E | 80/20 acrylate/vinylamine | 30–40 |
| F | 80/20 acrylate/vinylformamide | 30–40 |

Changes can be made in the composition, operation and arrangement of the method of the present invention described herein without departing from the concept and scope of the invention as defined in the following claims:

We claim:

1. A method for settling red mud from a Bayer process liquor, the method comprises adding to a Bayer process liquor containing suspended red mud a flocculant polymer which contains acrylic acid and from about 1 to about 99 mole percent of at least one monomer selected from the group consisting of vinylamine and vinylformamide.

2. The method of claim 1 where the polymer is a copolymer which contains between 2–50 mole percent of vinylamine.

3. The method of claim 1 where the polymer is a terpolymer which contains vinylamine and vinylformamide in amounts ranging between from about 2 to about 50 and from about 2 to about 50 mole percent, respectively.

4. The method of claim 1 where the polymer is a copolymer which contains between 10–40 mole percent of vinylamine.

5. The method of claim 1 where the polymer is added to a settler feed of the Bayer process.

6. The method of claim 1 where the polymer is added to a washer train of the Bayer process.

7. The method of claim 1 where the copolymer is derived from a lower (meth)acrylate ester or amide and vinylformamide which is subjected to hydrolysis to produce (meth)acrylate-vinylamine copolymers.

8. The method of claim 1, wherein the polymer is added to the Bayer liquor in conjunction with another flocculant selected from the group consisting of polyacrylates, hydroxamated polymer, acrylamide-acrylate copolymers, starch and dextran.

* * * * *